(12) United States Patent
Vaknin

(10) Patent No.: US 10,599,359 B2
(45) Date of Patent: Mar. 24, 2020

(54) DATA MIGRATION SYSTEM AND METHOD THEREOF

(71) Applicant: Kaminario Technologies Ltd., Yokne'am Ilit (IL)

(72) Inventor: Yogev Vaknin, Nesher (IL)

(73) Assignee: Kaminario Technologies Ltd., Yokne'am ILIT (IL)

( * ) Notice: Subject to any disclaimer, the term of this patent is extended or adjusted under 35 U.S.C. 154(b) by 0 days.

(21) Appl. No.: 15/792,862

(22) Filed: Oct. 25, 2017

(65) Prior Publication Data

US 2018/0046406 A1 Feb. 15, 2018

Related U.S. Application Data

(63) Continuation of application No. 14/708,581, filed on May 11, 2015, now abandoned.

(51) Int. Cl.
*G06F 3/06* (2006.01)

(52) U.S. Cl.
CPC .......... *G06F 3/0647* (2013.01); *G06F 3/0605* (2013.01); *G06F 3/0635* (2013.01); *G06F 3/0683* (2013.01)

(58) Field of Classification Search
CPC .... G06F 3/0647; G06F 3/0604; G06F 3/0644; G06F 3/0673
See application file for complete search history.

(56) References Cited

U.S. PATENT DOCUMENTS

| | | | |
|---|---|---|---|
| 9,128,942 B1* | 9/2015 | Pfau | G06F 16/13 |
| 2005/0278492 A1* | 12/2005 | Stakutis | G06F 11/2082 |
| | | | 711/161 |
| 2014/0143213 A1 | 5/2014 | Tal et al. | |
| 2015/0149605 A1* | 5/2015 | de la Iglesia | H04L 67/322 |
| | | | 709/223 |
| 2016/0335025 A1 | 11/2016 | Vaknin | |

OTHER PUBLICATIONS

EMC VPLEX 5.0 Architecture Guide, White paper, Apr. 2011 (Year: 2011).*
EMC VPLEX 5.0 Architecture Guide, White Paper Apr. 2011.

* cited by examiner

*Primary Examiner* — Ryan Bertram
*Assistant Examiner* — Edmund H Kwong
(74) *Attorney, Agent, or Firm* — Wiggin and Dana LLP; Gregory S. Rosenblatt; Rikesh P. Patel

(57) ABSTRACT

The presently disclosed subject matter includes a data storage system and method for the purpose of migrating data in a distributed storage system comprising a plurality of separate storage areas.

28 Claims, 7 Drawing Sheets

DATA MIGRATION SYSTEM AND METHOD THEREOF

FIELD OF THE PRESENTLY DISCLOSED SUBJECT MATTER

This invention relates to data migration in a storage system.

BACKGROUND

In various scenarios of distributed storage systems management, a need may arise to migrate data (including metadata and/or data) from one location in the storage system to a different location. For example, data can be moved from one location to the next on the same storage unit, or from one storage unit to another.

The need for data migration can arise, for example, for the purpose of load balancing between storage units, storage system expansion, storage unit replacement with a different storage unit in the storage system, and replication of data stored on one storage unit on another storage unit.

GENERAL DESCRIPTION

According to one aspect of the presently disclosed subject matter there is provided a computerized method of migrating data from a first storage area to a second storage area in a physical storage space of a data storage system; the physical storage space being operatively connected to an interface layer, the interface layer comprising at least one control unit; wherein data is assigned to a respective storage area in the physical storage space according to a predefined ownership function, the ownership function defines a connection between an address of the data and a respective storage area; the method comprising utilizing the at least one control unit for executing a data migration process, comprising:

receiving a new ownership function; scanning data addresses of data in the first storage area; identifying in the first storage area a first data having a first data address, the first data is destined to be migrated to the second storage area, according to the new ownership function;

determining whether a second data exists, received in a write request, the request comprising instructions to write the second data to a data address which is identical to the first data address;

if the second data exists, writing the second data to the second storage area according to the new ownership function; and writing the second data to the first storage area according to the first ownership function to replace the first data; and if the second data does not exist, writing the first data to the second storage area according to the new ownership function.

In addition to the above features, the method according to this aspect of the presently disclosed subject matter can optionally comprise one or more of features (i) to (x) below, in any desired combination or permutation.

i. Wherein the second data is in a commit data group, stored in designated computer memory; the commit data group comprising data from one or more write requests waiting to be written in an upcoming commit operation, the method further comprising: if the second data does not exist, adding the first data to the commit data group and writing the first data in the upcoming commit operation.

ii. The method further comprising, after completion of the scanning:

initiating an I/O intermission period; replacing the old ownership function with the new ownership function; terminating the I/O intermission period; and processing incoming I/O requests according to the new ownership function.

iii. wherein the at least one control unit includes at least a first control unit and a second control unit; the first control unit is assigned for controlling the first storage area and the second control unit is assigned for controlling the second storage area; the method further comprising, if the second data exists:

utilizing the first control unit for:

executing the writing of the second data to the first storage area to replace the first data; sending instructions to the second control unit for writing of the second data to the second storage area; and utilizing the second control unit for:

executing the writing of the second data to the second storage area according to the new ownership function.

iv. The method further comprising: utilizing the first control unit for:

receiving a second write request comprising instructions to write a third data; wherein the write request chronologically precedes the second write request and wherein the second data and the third data each pertain to a separate transaction;

if the third data is destined to be written to the second storage area, sending instructions to the second control unit for writing of the third data to the second storage area only after an acknowledgement has been received indicating that the instructions to write the second data have been received at the second storage area.

v. The method further comprising: scanning the first storage device a second time and deleting any data that has been migrated according to the new ownership function.

vi. The method wherein write transactions received during the migration process are executed in an asynchronous manner to the migration process.

vii. The method further comprising: writing data in the write requests to the first storage area according to the old ownership function; and writing data in the write requests to the second storage area according to the new ownership function.

viii. The further comprising: determining whether a given data in a received write request pertains to data stored according to the old ownership function in an address which has already been scanned in the migration process;

if it does, processing and writing the given data according to both the old ownership function and the new ownership function;

if it does not, processing and writing the given data only according to old ownership function.

ix. The method further comprising: dividing data in the scanned storage area into data a plurality of data subgroups according to a predefined rule;

running the migration process on data in each subgroup at a different time, thereby reducing the load on the storage system.

x. wherein the storage area is a storage unit.

According to another aspect of the presently disclosed subject matter there is provided a storage system comprising a plurality of storage areas constituting a physical storage space operatively connected to an interface layer; the interface layer comprising at least one control unit; wherein data is assigned to a respective storage area in the storage system according to a predefined ownership function, the ownership function defines a connection between an address of the data and a respective storage area; the at least one control unit is configured, for executing a data migration process for migrating data from a first storage area to a second storage area in the data storage system, to:

receive a new ownership function; scan data addresses of data in the first storage area; identify in the first storage area a first data having a first data address, the first data is destined to be migrated to the second storage area, according to the new ownership function; determine whether a second data exists, received in a write request, the request comprising instructions to write the second data to a data address which is identical to the first data address;

if the second data exists, write the second data to the second storage area according to the new ownership function; and write the second data to the first storage area according to the first ownership function to replace the first data; and if the second data does not exist, writing the first data to the second storage area according to the new ownership function.

According to another aspect of the presently disclosed subject matter there is provided a control unit operatively connected to an interface layer in a storage system, the storage system comprising a plurality of storage areas constituting a physical storage space operatively connected to an interface layer; wherein data is assigned to a respective storage area in the storage system according to a predefined ownership function, the ownership function defines a connection between an address of the data and a respective storage area; the control unit is configured, for executing a data migration process for migrating data from a first storage area to a second storage area in the data storage system, to:

receive a new ownership function; scan data addresses of data in the first storage area; identify in the first storage area a first data having a first data address, the first data is destined to be migrated to the second storage area, according to the new ownership function; determine whether a second data exists, received in a write request, the request comprising instructions to write the second data to a data address which is identical to the first data address;

if the second data exists, write the second data to the second storage area according to the new ownership function; and write the second data to the first storage area according to the first ownership function to replace the first data; and if the second data does not exist, writing the first data to the second storage area according to the new ownership function.

According to another aspect of the presently disclosed subject matter there is provided a non-transitory program storage device readable by a computer, tangibly embodying a computer readable instructions executable by the computer to perform a computerized method of migrating data from a first storage area to a second storage area in a physical storage space of a data storage system; the physical storage space being operatively connected to an interface layer, the interface layer comprising at least one control unit; wherein data is assigned to a respective storage area in the physical storage space according to a predefined ownership function, the ownership function defines a connection between an address of the data and a respective storage area; the method comprising utilizing the at least one control unit for executing a data migration process, comprising:

receiving a new ownership function; scanning data addresses of data in the first storage area; identifying in the first storage area a first data having a first data address, the first data is destined to be migrated to the second storage area, according to the new ownership function; determining whether a second data exists, received in a write request, the request comprising instructions to write the second data to a data address which is identical to the first data address;

if the second data exists, writing the second data to the second storage area according to the new ownership function; and writing the second data to the first storage area according to the first ownership function to replace the first data; and if the second data does not exist, writing the first data to the second storage area according to the new ownership function.

The storage system, control unit and storage device disclosed herein can optionally further comprise one or more of features (i) to (x) listed above, mutatis mutandis, in any desired combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1A:
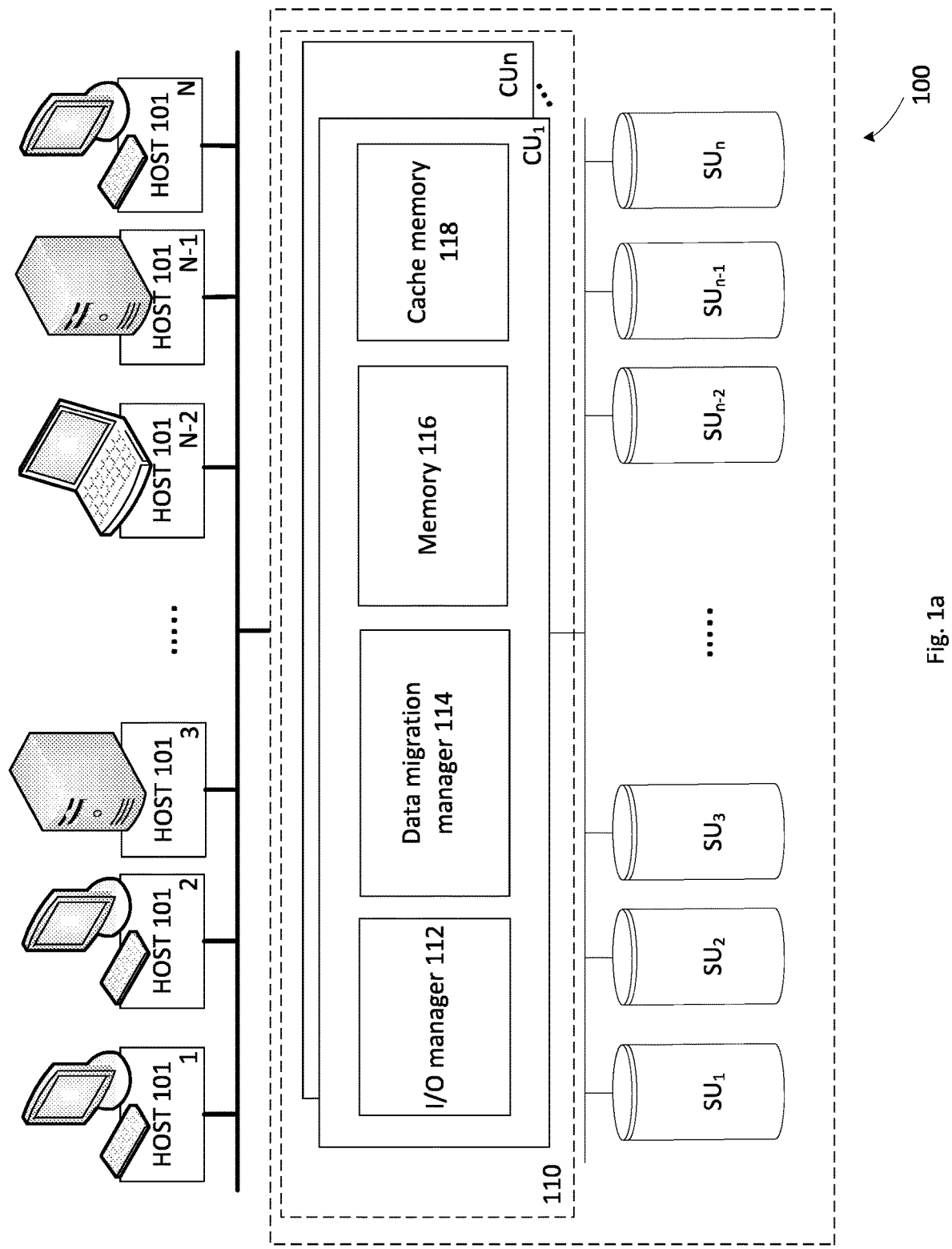
FIG. 1a is a functional block diagram of a storage system, according to an example of the presently disclosed subject matter.

Elements in the drawings are not necessarily drawn to scale.

Unless specifically stated otherwise, as apparent from the following discussions, it is appreciated that throughout the specification discussions utilizing terms such as "receiving", "scanning", "identifying", "determining", "writing", "sending", "initiating", "terminating", "replacing", "processing" or the like, include actions and/or processes of a computer that manipulate and/or transform data into other data, said data represented as physical quantities, e.g. such as electronic quantities, and/or said data representing the physical objects.

Each control unit (CU) in interface layer 110 described below comprises or is otherwise operatively coupled to at least one data processing device. The term "data processing device", "computer", "computer processor", "processor", "controller" or the like should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

In embodiments of the presently disclosed subject matter, fewer, more and/or different stages than those shown in FIG. 2, and FIGS. 3 to 6 may be executed. In embodiments of the presently disclosed subject matter, one or more stages illustrated in FIG. 2 and FIGS. 3 to 6 may be executed in a different order and/or one or more groups of stages may be executed simultaneously. For example, FIG. 3 describes that a write request is received in operation (1) and additional data destined to be migrated is identified in operation (2). It is noted that the order of the operations in the description below does not imply that these two operations necessarily occur one after the other in the specified chronological order and in some cases operation (2) may occur before operation (1).

FIG. 1 illustrates a general schematic of the system architecture in accordance with an embodiment of the presently disclosed subject matter. Functional elements in FIG. 1 can be made up of a combination of software, hardware and/or firmware that performs the functions as defined and explained herein. Functional elements in FIG. 1 may be centralized in one location or dispersed over more than one location. In other embodiments of the presently disclosed subject matter, the system may comprise fewer, more, and/or different elements than those shown in FIG. 1.

Bearing the above in mind, attention is drawn to FIG. 1 illustrating a functional block diagram of a storage system, according to an example of the presently disclosed subject matter. Storage system 100 comprises a physical storage space with one or more storage units ($SU_{1-n}$), each storage unit comprising one or more storage devices. Storage devices may be any one of Hard Storage devices (HDD) or Solid State Drives (SSD, comprising for example, a plurality of NAND elements), DRAM, non-volatile RAM, or any other computer storage technology or combination thereof.

Storage system 100 further comprises a interface layer 110 comprising various control devices operatively connected to the physical storage space and to one or more hosts ($101_{1-n}$), and configured to interface layer operations (including I/O operations) in the storage system. Interface layer 110 can be further configured to provide a virtual storage layer logically representing the physical storage space as well as the required mapping between the physical storage space and its respective logical representation.

Control devices in interface layer 110 as well as storage units ($SU_{1-n}$) in the physical storage space can be consolidated in a single unit, or can be otherwise distributed over one or more computer nodes connected across a computer network. Furthermore, interface layer 110 can comprise a plurality of control units $CU_{1-n}$ (e.g. each control unit implemented as a dedicated server computer device) each control unit is assigned for managing the operation of a certain area within the physical storage space (e.g. the area comprising for example one or more designated storage units). It is noted that the term "storage unit" which is used herein should be broadly construed to include any area in the physical storage space, including for example, one or more storage units logically combined to represent a single storage unit and/or any part of a storage unit and/or parts of different storage units which are logically combined to represent a single storage unit.

Communication between hosts ($101_{1-n}$) and interface layer 110, between interface layer 110 and storage units ($SU_{1-n}$) and between different control units in interface layer 110 can be realized by any suitable infrastructure and protocol. According to one example, communication between various elements of storage system 100 is implemented with a combination of Fiber Channel (e.g. between hosts and interface 110), SCSI (e.g. between interface 110 and storage units) and InfiniBand (e.g. interconnecting different control units in interface 110) communication protocols.

Figure 1B:
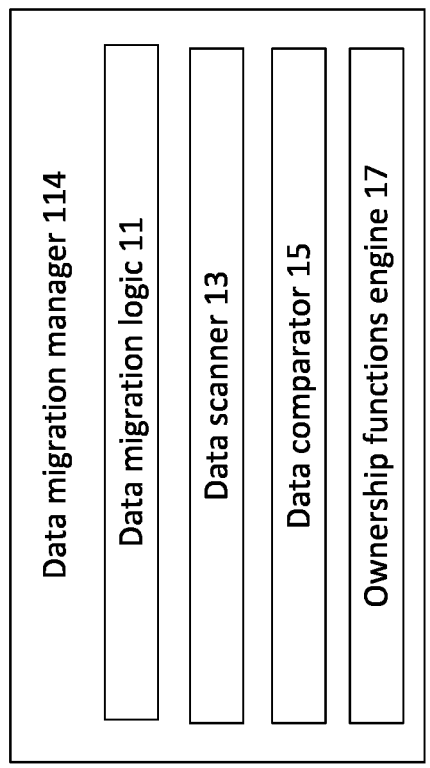
FIG. 1b is a functional block diagram of a data migration manager, according to an example of the presently disclosed subject matter.

Notably, while FIG. 1 illustrates the components of a single control unit in interface layer 110, this is done for the purpose of simplicity and clarity and the presently disclosed subject matter contemplates a interface layer 110 configured with multiple control units ($CU_1$ to $CU_n$ as indicated in FIG. 1a). As apparent from the present disclosure, principles described with respect to a single control unit similarly apply to two or more control units.

Interface layer 110 can comprise, for example, I/O (input, output) manager 112 and migration manager 114. Interface layer can further comprise memory 116 and cache memory 118. Memory 116 can include transitory and non-transitory computer memory. Memory 116 can be utilized for example for storing information needed for mapping between the physical storage space and the respective logical representation as mentioned above. For instance, RAID distribution tables logically representing distribution of data and syndrome segments to storage devices can be stored in memory 116. Cache memory 118 can be utilized for example, by I/O manager 112 during execution of I/O commands as known in the art.

As an alternative to being incorporated as part of interface layer 110, I/O manager 112 and/or migration manager 114 can be implemented as part of the client software or implemented on an external server or be otherwise operatively connected to the storage system for enabling management of I/O operations. I/O manager 112 and migration manager 114 can be consolidated and implemented as a single operational device or their functionality can be otherwise distributed over multiple devices.

I/O manager 112 is configured to handle I/O requests received, for example from hosts $101_{1-n}$. Responsive to an I/O request I/O manager 112 is configured to direct the request to the storage unit which currently stores the relevant data in the I/O request. According to one example, in a multiple control units CU configuration, where different control units CU are connected to different storage units (or to different areas in the physical storage space, which can be otherwise separated, e.g. different parts of the same storage unit), a first control unit which receives an incoming I/O request, is configured to determine whether the I/O request should be forwarded to a different control unit for execution, or whether it can be executed locally by the receiving control unit.

An I/O manager in each given control unit is assigned with an ownership function ƒ(x)=y defining a connection between a given data address (e.g. block address) and a respective storage unit. Given a certain data (including data and/or metadata) value, the I/O manager 112 is configured to utilize the ownership function to obtain a desired output pertaining to the respective storage unit where the data should be written to or should be read from.

The ownership function can be represented as a mathematical formula, as a conversion table or any other suitable format which enables to determine, based on a given data address, a corresponding storage device destination as described above.

As mentioned above, migration of data from one location to another in a storage system is needed at certain times. During data migration it is desired to comply with a number of operational requirements, including for example: maintaining data and metadata persistency during data migration (e.g. all data and metadata content in the storage system should not be changed or damaged during the migration process); maintaining the effect of the migration process on the storage system performance as minimal as possible; preserving high availability of the storage system during the migration process; and allowing quick roll-back in the event of interruption of the migration process. Interruption of the migration process can result, for example, from an unintentional system failure, or from a user initiated, or system initiated, abort of the process.

According to the presently disclosed subject matter, a migration process is disclosed which complies with the requirements mentioned above. Furthermore, according to the presently disclosed subject matter, a storage system (as well as a control unit implemented therein) are disclosed which are configured to execute the data migration process disclosed herein. The data migration process disclosed herein is suitable (but is not necessarily limited to) transaction based storage systems.

Many distributed storage systems are transaction based, meaning that a certain group of data is written to the storage media (storage device) at a certain point in time (referred to herein as a "synch-point") when the system is ready to execute the writing of the grouped data. For example, data destined for writing can be gathered in some type of log or journal and executed at a certain time. The execution of the grouped transactions is commonly referred to as a "commit". The data and metadata destined for writing is grouped (referred to herein as "commit data group") and once one or more commit conditions are satisfied (e.g. a certain time period has lapsed from a previous commit and the synch-point is reached), a commit operation is executed and the grouped data is written to its assigned location in the storage system. Following the commit operation, the entire process repeats, and new I/O operations are grouped in a new commit data group awaiting their execution in the next commit operation. Notably, the term "commit data group" may refer to a group comprising any amount of data, including for example data received in one write request or data received in multiple write requests.

Figure 2:
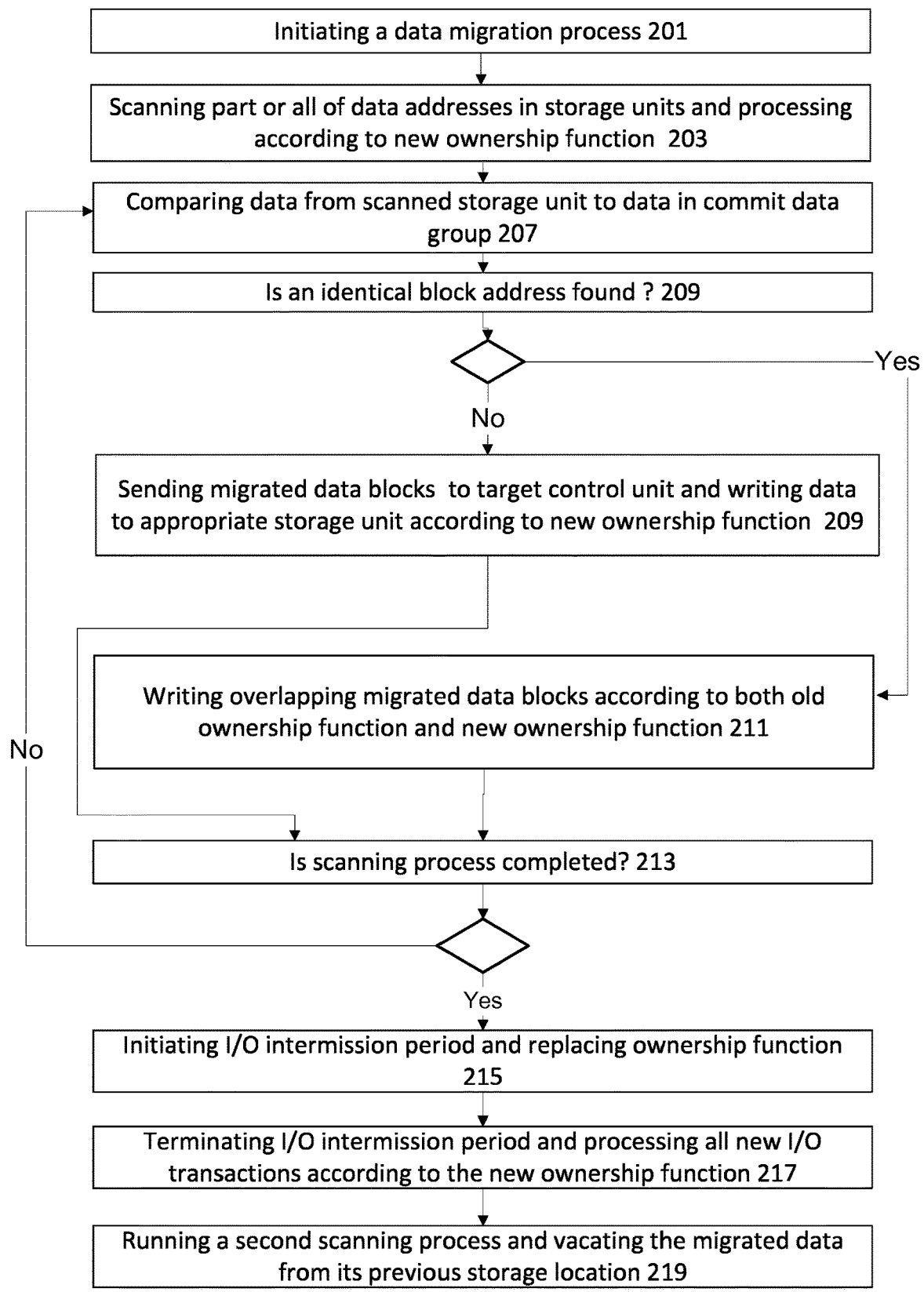
FIG. 2 is a flowchart showing an example of a sequence of operations performed according to an example of the presently disclosed subject matter.

FIG. 2 is a flowchart showing a sequence of operations executed according to an example of the presently disclosed subject matter. Operations described with reference to FIG. 2 can be executed for example, by interface layer 110 and more specifically by data migration manager 114 mentioned above and further described below with reference to FIG. 1*b*. According to one example, data migration logic 11 can include instructions for executing the data migration process including at least operations described below with reference to FIG. 2.

As explained above, during normal operation I/O requests are directed to the appropriate storage unit in the storage system based on an ownership function defining the association between a given data address and a respective storage unit.

At block 201 a data migration process is initiated. The data migration initiating command includes a new ownership function ƒ'(x)=y' replacing the previous ownership function ƒ(x)=y.

Following the data migration initiating, a scanning operation is initiated (block 203). During the scanning operation, part or all of the addresses of the data stored in storage units ($SU_{1-n}$) are scanned and processed using the new ownership function. The result of the processing indicates which part of the stored data should be migrated to a different location in the storage system according to the new ownership function.

Scanning can be executed for example with the help of data scanner 13 which is configured to read the information pertaining to addresses of the data stored in one or more storage units which are designated to undergo data migration. The scanned addresses are processed using the new ownership functions (e.g. by ownership function engine 17) to determine whether the respective stored data should be migrated or not. The ownership functions can be stored in a computer memory accessible to migration manager 114 and possibly also I/O manager 112.

Data blocks which, according to the new ownership function, are destined to be moved to a different location e.g. a different storage unit (referred to herein below as "migrated data blocks") are sent (e.g. by migration manager 114) through the storage system network to a relevant control unit assigned for controlling a storage unit being the destination of the migrated blocks.

Data blocks which, according to the new ownership function, are destined to be moved to a different location, can be copied (e.g. by migration manager 114) from their current location and stored in a temporary storage area (e.g. in memory 116).

According to one example, as the scan progresses, more migrated data blocks destined for migration can be grouped together in a group of data (referred to herein as a "migration data group").

According to the presently disclosed subject matter, if a commit data group comprising data waiting to be written in the next synch-point exists (e.g. received from external entities such as hosts 101), before the migrated data blocks are sent to their new destination, they are compared to data in the commit data group to determine whether newer, more updated versions exist of the same data. Comparison can be performed with the help of data comparator 15.

Migrated data blocks (e.g. in the migration data group) are compared to the data in the current commit data group in order to identify overlapping blocks (block 207). Overlapping blocks pertain to migrated data blocks and blocks in the commit data having identical addresses. If overlapping blocks are found, it means that data in the blocks which are currently being migrated have a newer, more updated version in the commit data group.

According to one example, data migration manager 114 can be configured to process reads made from the scanned storage unit, one by one. Each read comprises one or more migrated data blocks read from the scanned storage unit and destined to be migrated to a respective storage unit. Migrated data blocks of a current read are compared to the data in the commit data group awaiting execution.

If no identical block addresses (overlapping blocks) are found, the data from the migrated data blocks are sent, according to the new ownership function, to a target control unit $CU_t$ (herein below "new target control unit") assigned to control the new target storage unit (block 209). The migrated data block is written to the new target storage unit by the target control unit $CU_t$. These operations result in two copies of the migrated data blocks, one previously stored according to the old ownership function, and the other stored at the new storage unit according to the new ownership function.

According to one example, migrated data blocks are added to the commit data group to be written to their new destination in the next commit.

According to another example, as the scan progresses, migrated data blocks (including both overlapping and non-overlapping data) destined for migration which are grouped together in a "migration data group" are written to their new destination asynchronously to the writes of the commit data group.

If an identical block address is found in both the commit data group and the migrated blocks, the modified data (new data received in the write request) is written to the old storage unit (according to the old ownership function) and also sent (according to the new ownership function) to a new target control unit $CU_t$ assigned to the new target storage unit, where it is written to the new target storage unit by the target control unit $CU_t$ (block 211). Notably, in case more than one overlapping block with identical address is present in the same commit data group, the most updated data is written to the storage units.

These operations also result in two updated copies of the migrated data blocks, one updated copy written instead of the previous data (according to the old ownership function) and the other stored at the new storage unit (according to the new ownership function). Maintaining a copy of the relevant data in both the old storage unit and the new target storage unit, enable to execute a quick and simple rollback, in the event that the migration process is aborted before completion.

As the data migration process proceeds, new I/O requests may be received. The respective transactions are executed (e.g. with the help of I/O manager 112) asynchronously to the migration process. Notably, depending on the specific implementation the term "transaction" as used herein pertains to a single write or to multiple writes grouped to be executed together (e.g. in commit data groups).

Accordingly, data in commit data groups is continuously written once a respective synch-point is reached. Notably, I/O manager 112 in a given control unit $CU_1$ can be configured to operate according to the both the new and the old ownership functions. When written, the data in the commit data group is processed according to both the old ownership function $f(x)=y$ (thus written to the old storage unit) and according to the new ownership function $f'(x)=y'$) (thus written to the new target storage unit).

This operation results in two copies of the new data blocks. One copy is written to the old storage unit according to the old ownership function and replaces the old data, if such data exists. The other copy is stored at the new target storage unit according to the new ownership function.

Optionally, data blocks in the commit data group pertaining to block addresses which have not been scanned in the scanning process can be executed only according to the old function. These blocks will be later processed as part of the scanning process to determine whether they should be migrated or not.

In order to maintain data persistency, only once the data in the current commit data group has been received at the target control unit, controlling the target storage unit and respective acknowledgments are received for all data writes pertaining to the same commit data group, the system turns to process the data in the next commit data group. Acknowledgments indicate that respective write instructions have been received at the target control unit $CU_t$. Accordingly, data migration manager 114 in the source control unit $CU_s$ can be configured, after processing a given commit data group and sending instructions to a different control unit $CU_t$ to write data from the commit data group to a new target storage unit, to wait until all acknowledgments are received for all data writes pertaining to the commit data group before proceeding to processing the next commit data group. The actual writing of data to the storage unit is performed by the target control unit $CU_t$ in an asynchronous manner to the operation of the source control unit $CU_s$. This approach enables to avoid re-writing of data resulting from a network bypass. Without acknowledgement, two different versions written (each pertaining to and written in a different commit operation) to the same address can be sent to the storage system network at the same time, creating a risk that the older data is received and written at the target $CU_t$ over the newer and more updated data.

As mentioned above according to one example, migrated data blocks destined for migration which are grouped together in "migration data group" can be written to their new destination asynchronously to the writes of the commit data group. In such a case, in the event that overlapping data blocks are found, it would be desirable to avoid writing the same data twice, once according to instructions received from migration manager 114 and a second time according to instructions received from I/O manager 112 after the respective synch-point is reached. Accordingly, overlapping blocks can be marked as such and written only once in one of the writing operations. For example, migration manager can 114 can be configured to mark the overlapping data blocks, in which case these blocks are written only once the next commit operation is executed. According to a different example, overlapping blocks in the commit data group can be marked to indicate that these blocks are written as part of the migration process and accordingly should not be written as part of the commit operation.

Furthermore, similar to the commit data group, in order to maintain data persistency, only once the data in the current migration data group has been processed and received at the target control unit controlling the target storage unit, and respective acknowledgments are received for all data writes pertaining to the same commit data group, the system turns to process the data in the next migration data group.

If the scanning process is not completed, the migration process continues (returning to block 207). As the scanning process proceeds, more scanned data is uploaded by the data migration manager and processed according to the operations described above with reference to blocks 207 to 213.

If, however, the scanning process is completed (e.g. all relevant storage units in storage system 100 have been scanned and stored data has be rewritten according to the new ownership function) an I/O intermission period is initiated (block 215). During the I/O intermission period, execution of all I/O transactions is stopped. Generally, the length of I/O intermission period is kept as short as possible and may not exceed a fraction of a second (e.g. 200 to 400 milliseconds). During the I/O intermission period, the new ownership function is assigned to I/O manager 112 and replaces the old ownership function, which becomes obsolete at this point. During the I/O intermission period the ownership function is replaced in all the control units in the storage system, comprising multiple control units ($CU_{1-n}$).

Following the ownership function replacement, the I/O intermission period is terminated (block 217). From this point on, all incoming I/O operations are executed according to the new ownership function.

Optionally, a second scanning process is executed (block 219). The second scanning process can be executed as a background process. During the second scanning operation, the same storage units which were scanned during the first time, are scanned a second time and data which has been migrated to a new storage unit during the data migration process is deleted from its original location. Optionally, storage units where data has been migrated are marked during the migration process (e.g. by migration manager 114) and only those storage units are scanned a second time.

The data migration technique disclosed herein enables to reduce the effect of migration on the storage system performance. This is due to the fact that data migration execution and I/O requests execution are performed asynchronously from one another. As a result, a transaction (I/O request) is written to the target storage unit substantially without delay as soon is the relevant synch-point is reached. In the more common scenario where the write to the media in the storage unit is slower than the data transmission over the network connections, the migration process may have no effect on the system performance.

Another advantage of the proposed migration method is the ability to perform quick roll-back of the data migration. If some problem occurs during the migration process (such as a network problem or user initiated abort), data migration can be instantly stopped. As the migrated data has been kept in its original storage location as defined by the original ownership function, the storage system can easily revert to the status before commencement of the data migration process.

The proposed migration method also provides retention of data redundancy during the migration process. Since the original data distribution is maintained until the end of the migration process, the data redundancy and fault tolerance of the system is not affected by the migration process.

Furthermore, the disclosed migration method is generic, and can be applied to any transaction based storage systems. It can also be used for different applications, such as replication, scale-out storage expansion, load rebalancing on distributed storage, etc.

Additionally, the migration method disclosed herein can be used for the migration of both data and metadata. For example, during migration of a given data block metadata describing the data (e.g. time of last read of data) can be migrated together with the data.

The presently disclosed subject matter also allows to regulate the effect on the system performance. For a given set S of keys (block addresses) which need to be migrated to a new location (e.g. storage unit $SU_x$) in the storage system, a set of functions can be defined:

$$\{f'_1, f'_2, \ldots, f'_n | \cup_{i=1}^{n} \{x | f'_i(x) = SU_x\} = S\}$$

For each $f'_i$ the full process described above with reference to FIG. 2 is executed. Essentially, the data in the scanned storage units is divided into data subgroups according to a predefined rule. Each subgroup is migrated separately at a different time. The higher the value of 'n' is (i.e. the number of the subgroups), the smaller the performance impact, since fewer data and metadata entries are being migrated (a side effect is that the entire migration process becomes longer).

Figure 3:
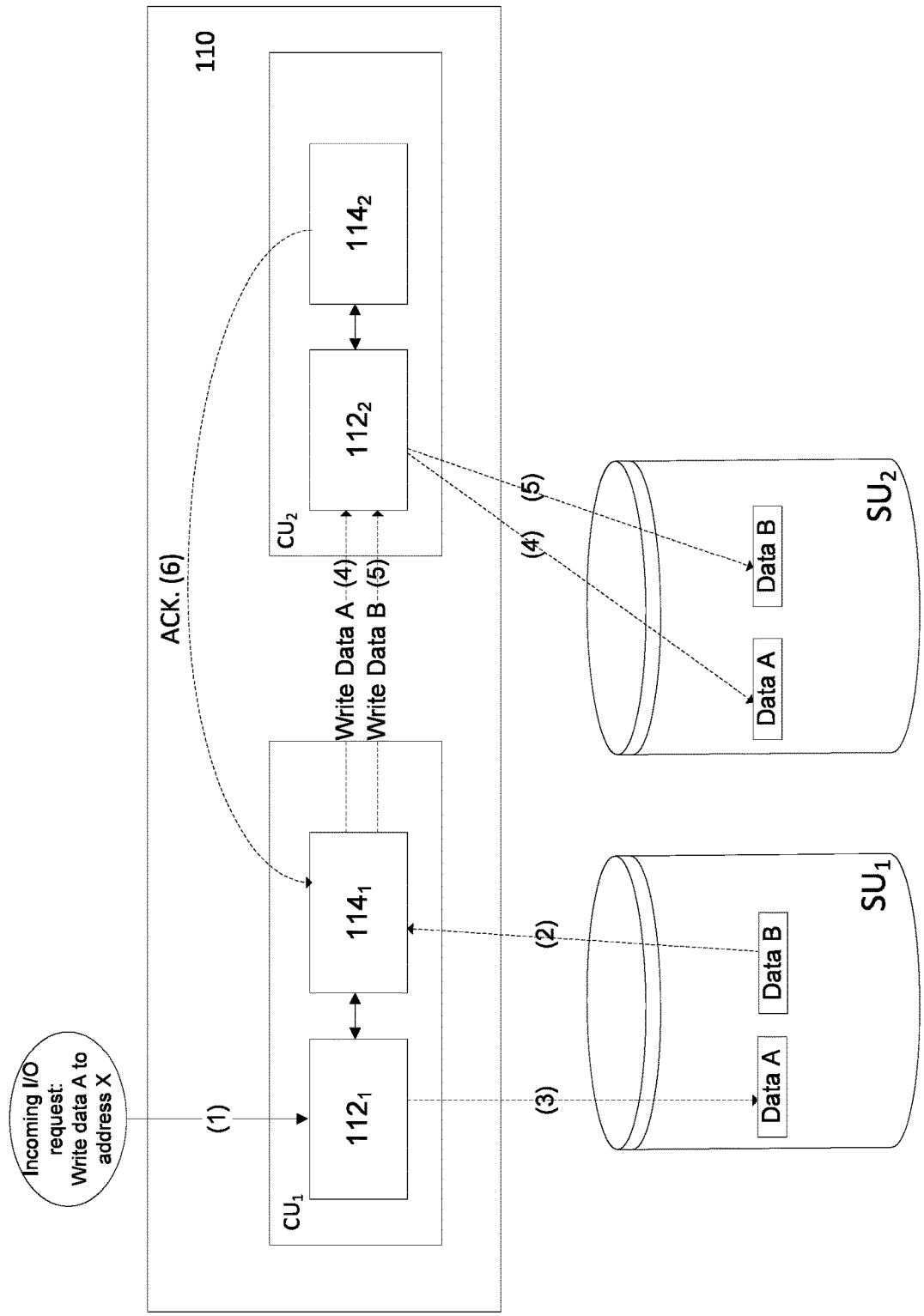
FIG. 3 is a first schematic illustration demonstrating data migration according to an example of the presently disclosed subject matter.

FIG. 3 is a schematic illustration demonstrating data migration according to an example of the presently disclosed subject matter. While the example illustrated in FIG. 3 shows two storage units ($SU_1$ and $SU_2$), the principles described with reference to FIG. 3 (as well as FIGS. 4 to 6) are also applicable to a storage system with any number of storage units, and therefore the illustration should not be construed as limiting. Numbers in parenthesis shown in FIGS. 3 to 6 indicate the corresponding operations described below. The examples illustrated in FIGS. 3 to 6 assume that a data migration process has been initiated, a new ownership function has been presented and scanning of the storage units has started.

Interface layer 110 in FIG. 3 comprises two control units ($CU_1$—source control unit and $CU_2$—target control unit) each comprising a respective I/O manager and data migration manager. In the current example no overlapping blocks were found during a comparison between migrated blocks and the current commit data group.

(1) A write request is received at control unit $CU_1$, requesting to write data (e.g. spanning one or more data blocks) comprising content A to address X. The write request can be sent for example, by one of the host computer devices connected to the storage system (hosts $101_{1-n}$ in FIG. 1). As explained above this data can be added to a current commit data group waiting to be written in the next commit operation.

(2) In addition during the scanning process another data (e.g. spanning one or more data blocks) comprising content B in address Y is identified in $SU_1$ as a data that should be migrated to $SU_2$ according to the new ownership function.

Data from the scanned media is compared with the data in the commit data group and no overlapping blocks are found.

(3) Data content A is written to $SU_1$ according to the old ownership function replacing the previous version of the same data.

Since the two data are designated to different addresses, both data A (4) and data B (5) are written to $SU_2$ according to the new ownership function in two separate write operations.

(6) Once instructions pertaining to data A are received at $CU_2$ the respective data migrating manager $114_2$ sends an acknowledgement (ACK.) back to data migration manager $114_1$. Once the ACK. is received, data migration manager $114_1$ can continue to send data pertaining to another transaction. As explained above, where data is processed and written to the storage units in groups (commit data groups) acknowledgements pertaining to all the data in the current commit data group need to be received at data migration manager $114_1$ before transmission of instructions pertaining to the next commit data group can commence.

Figure 4:
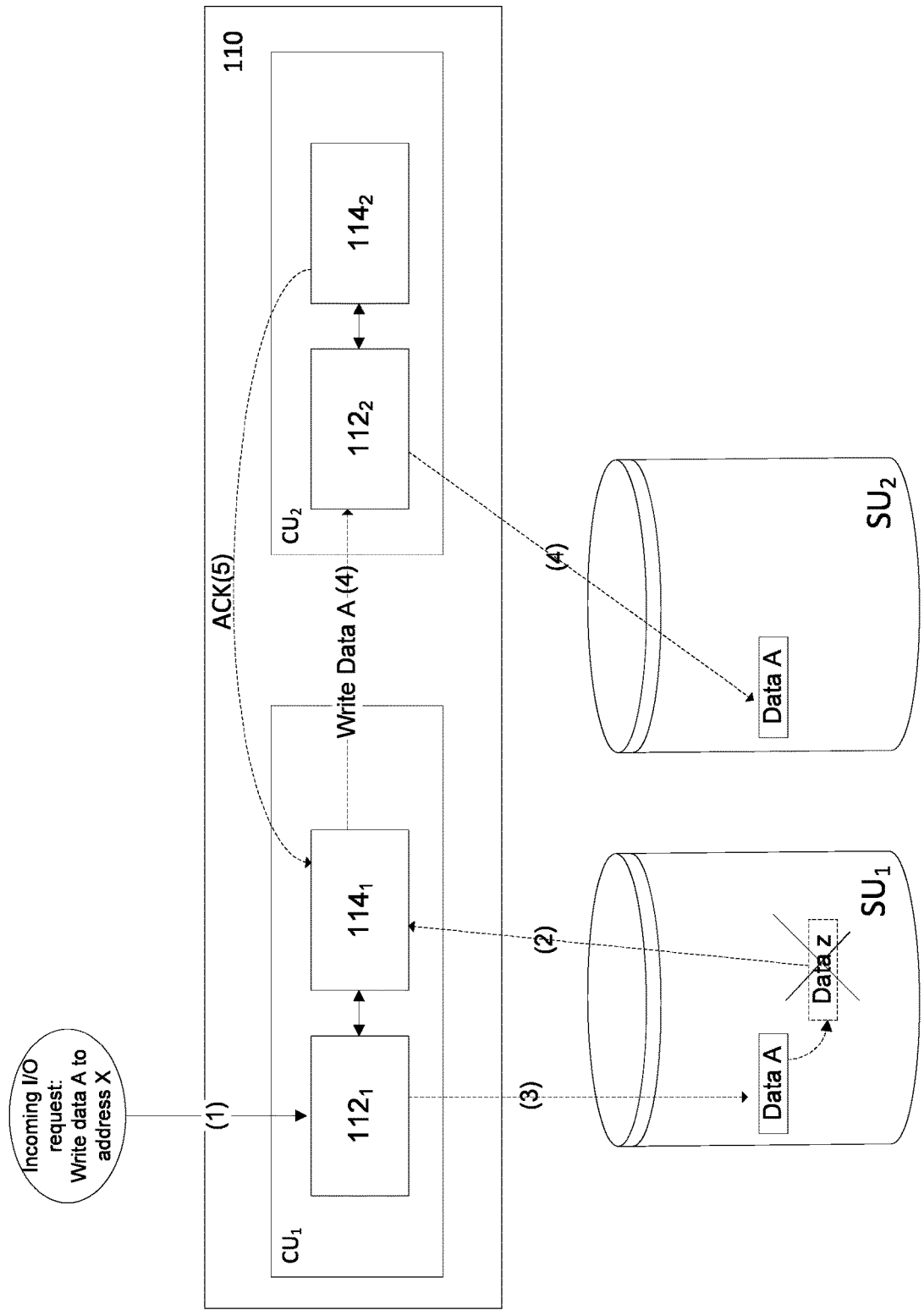
FIG. 4 is a second schematic illustration demonstrating data migration according to an example of the presently disclosed subject matter.

FIG. 4 is another schematic illustration demonstrating data migration according to an example of the presently disclosed subject matter. The storage system setup shown in FIG. 4 is similar to the example shown in FIG. 3. However, different than the previous example, here overlapping blocks are found during a comparison between migrated blocks and the current commit data group.

(1) A write request is received at control unit $CU_1$, requesting to write data (e.g. spanning one or more data blocks) comprising content A in address X. The write request can be sent for example, by one of the host computer devices connected to the storage system (hosts $104_{1-n}$ in FIG. 1). This data can be added to a current commit data group waiting to be written in the next commit operation.

(2) In addition during the scanning process another data (e.g. spanning one or more data blocks) comprising content Z in address X is identified in $SU_1$ as a data that should be migrated to $SU_2$ according to the new ownership function.

Data from the scanned media is compared with the data in commit data group and found to overlap (i.e. pertain to the same address) with data B.

Since data Z originally stored in $SU_1$ has been modified by the write request, data A represents a more updated version of the same data. Accordingly, data migration manager finds that data A (currently awaiting to the synch-point) represents a newer and therefore a valid version of the data stored in location X.

(3) Data A is written to $SU_1$ replacing the previous version of the data (data Z).

(4) The more updated data A is also written to $SU_2$ according to the new ownership function.

(5) Once instructions pertaining to data A are received at $CU_2$ the respective data migrating manager $114_2$ sends an acknowledgement (ACK.) back to the source control unit. Following the acknowledgment, data pertaining to the next transaction can be sent to a respective target control unit.

Figure 5:
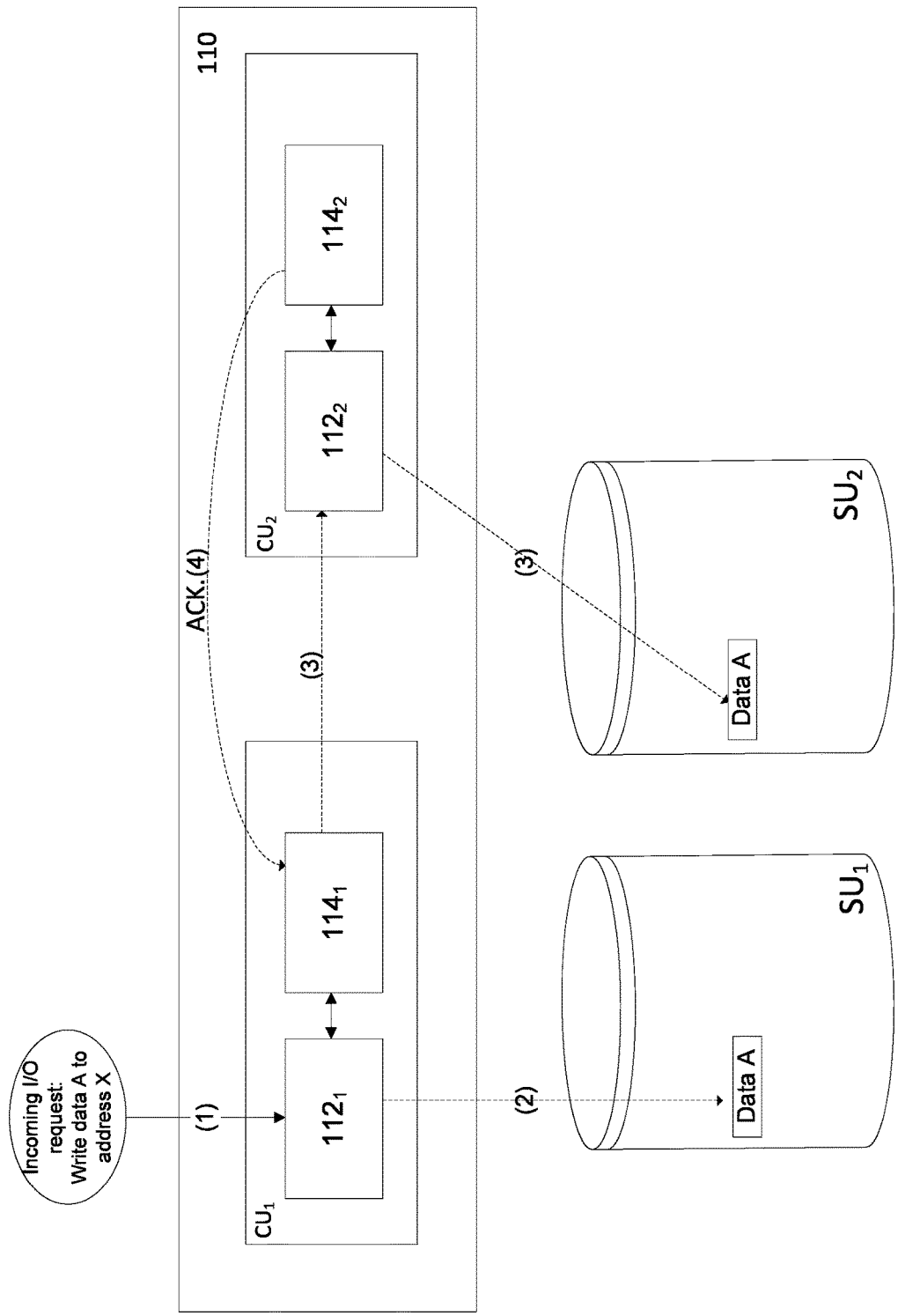
FIG. 5 is a third schematic illustration demonstrating data migration according to an example of the presently disclosed subject matter.

FIG. 5 is another schematic illustration demonstrating data migration according to an example of the presently disclosed subject matter. As in FIG. 3 and FIG. 4, FIG. 5 shows a non-limiting example of a storage system comprising two storage units. Interface layer 110 in FIG. 4 shows two control devices ($CU_1$ and $CU_2$) each comprising a respective I/O manager and data migration manager. FIG. 5 demonstrates an asynchronous write operation of an incoming write occurring during a concurrent migration process.

(1) A write request is received at control unit $CU_1$, requesting to write data (e.g. spanning one or more data blocks) comprising content A in address X. The write request can be sent for example, by one of the host computer devices connected to the storage system (hosts $101_{1-n}$ in FIG. 1). As explained above, this data can be added to a current commit data group waiting to be written in the next commit operation.

(2) Data A is written to $SU_1$ according to the old ownership function.

(3) Data A is also written to $SU_2$ according to the new ownership function.

(4) Once data A is received at CU2 the respective data migrating manager 1142 sends an acknowledgement (ACK.) Following the acknowledgment, data pertaining to the next transaction can be sent to a respective target control unit.

Figure 6:
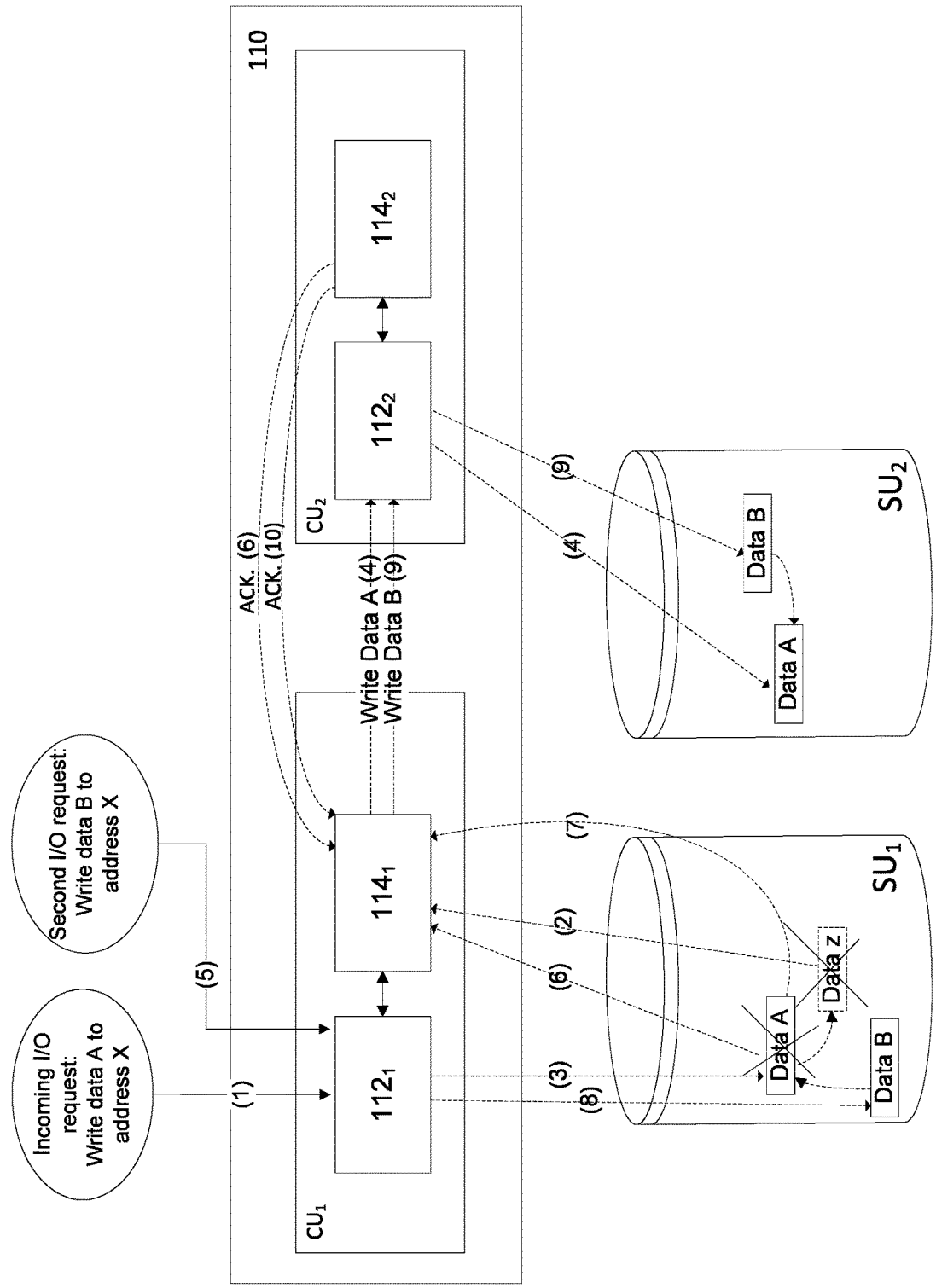
FIG. 6 is a fourth schematic illustration demonstrating data migration according to an example of the presently disclosed subject matter.

FIG. 6 is a fourth schematic illustration demonstrating data migration process according to an example of the presently disclosed subject matter. The storage system setup shown in FIG. 6 is similar to the examples shown above, however, this example shows two sequential write requests made to the same address.

(1) A write request is received at control unit $CU_1$, requesting to write data (e.g. spanning one or more data blocks) comprising content A in address X. The write request can be sent for example, by one of the host computer devices connected to the storage system (hosts $101_{1-n}$ in FIG. 1). This data can be added to a current commit data group waiting to be written in the next commit operation.

(2) In addition during the scanning process another data (e.g. spanning one or more data blocks) comprising content Z in address X is identified in $SU_1$ as a data that should be migrated to $SU_2$ according to the new ownership function.

Data from the scanned media is compared with the data in the commit data group and found to overlap (i.e. pertain to the same address) with data B.

Since data Z originally stored in $SU_1$ has been modified by the write request, data A represents a more updated version of the same data. Accordingly, data migration manager finds that data A (currently awaiting to the synch-point) represents a newer and therefore a valid version of the data stored in location X.

(3) Data A is written to $SU_1$ replacing the previous version of the data (data Z).

(4) The more updated data A is also written to $SU_2$ according to the new ownership function.

(5) A second write request is received at control unit $CU_1$, requesting to write data (e.g. spanning one or more data blocks) comprising content B in address X.

As mentioned above, data migration manager is configured to handle transactions sequentially; only after the processing of the previous transaction is completed (i.e. a respective ACK. is received), the system proceeds with the next transaction. The second transaction is not sent out for execution by migration manager $114_1$ until one or more acknowledgments indicating that all data in the previous transaction has reached its destination are received from migration manager $114_2$.

(6) Once data A is received at $CU_2$ the respective data migrating manager $114_2$ sends an acknowledgement (ACK.)

Responsive to the received acknowledgement, migration manager $114_1$ proceeds to process the following write request comprising content B directed to be written at address X.

(7) Data from the scanned media is compared with the data in the commit data group and no overlapping blocks are found.

(8) Data content B is written to $SU_1$ according to the old ownership function (f(address: X)=$SU_1$) replacing the previous version i.e. data content A.

(9) Data content B is also written to $SU_2$ according to the new ownership function f'(address: X)=$SU_2$.

(10) Once data content B is received at $CU_2$ the respective data migrating manager $114_2$ sends an acknowledgement (ACK.)

This sequential operation assists to avoid data corruption and maintain data persistency. Without the sequential operation, both data A and B may have been sent together to their respective storage destination. When sent together to the internal storage system network there is a risk that the more updated data B is written first to the target address to be later overwritten with the older and less updated data A.

The term "data address" which is used herein should be broadly construed to include any type of data identifier used for identifying and accessing data stored in a data-storage. One example is data address such as "logical block address" or "LBA", which relates to the basic reference unit which commonly used by external hosts to address IO requests to the storage system.

Another example is hash key used for indexing data in a hash table. Consider, for instance, a deduplication database (one such deduplication databased is disclosed in U.S. patent application Ser. No. 13/684,205 which is incorporated herein by reference in its entirety) which is used for storing hash keys calculated from content of data, each key referencing to a respective address, where the data is stored. In the event a new storage unit is added to the storage system, it may be desired to distribute the storage data over the entire storage system including the new storage unit. According to the presently disclosed subject matter, an appropriate ownership function can be used for migrating data in the storage system for the purpose of evenly distributing the data across all storage devices. The ownership data is configured to receive as input metadata from the deduplication database (in this example hash keys) and provide as output the target storage unit (and respective control unit) where the data should be stored. As the hash keys are used as identifiers of respective data, they are considered within the definition of the term "data address" as used herein.

It is to be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a machine-readable memory tangibly embodying a program of instructions executable by the machine for executing the method of the presently disclosed subject matter.

The term "non-transitory" is used herein to exclude transitory, propagating signals, but to otherwise include any volatile or non-volatile computer memory technology suitable to the application.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

What is claimed is:

1. A computerized method of migrating data from a first storage area to a second storage area in a physical storage space of a data storage system; the physical storage space being operatively connected to an interface layer, the interface layer comprising at least one control unit; wherein data is assigned to a respective storage area in the physical storage space according to a predefined ownership function, the ownership function defines a connection between an address of the data and a respective storage area; the method comprising utilizing the at least one control unit for executing a data migration process, comprising:
   receiving a new ownership function;
   scanning data addresses of data in the first storage area;
   identifying in the first storage area a first data having a first data address, the first data being destined to be migrated to the second storage area, according to the new ownership function;
   determining whether exists a second data in a pending write request currently waiting to be written that comprises instructions to write the second data to a data address which is identical to the first data address, wherein the second data is in a commit data group, stored in designated computer memory; the commit data group comprising data from one or more write requests waiting to be written in an upcoming commit operation;
   and if the second data exists:
   writing the second data in the upcoming commit operation to the second storage area according to the new ownership function; and writing the second data to the first storage area according to the first ownership function to replace the first data.

2. The computerized method according to claim 1, the method further comprising: if the second data does not exist, adding the first data to the commit data group and writing the first data in the upcoming commit operation.

3. The computerized method according to claim 1 further comprising, after completion of the scanning:
   initiating an I/O intermission period;
   replacing the old ownership function with the new ownership function;
   terminating the I/O intermission period; and
   processing incoming I/O requests according to the new ownership function.

4. The method according to claim 1 wherein the one or more control unit includes at least a first control unit and a second control unit; the first control unit is assigned for controlling the first storage area and the second control unit is assigned for controlling the second storage area;
   the method further comprising, if the second data exists:
   utilizing the first control unit for:
   executing the writing of the second data to the first storage area to replace the first data; and
   sending instructions to the second control unit for writing of the second data to the second storage area; and
   utilizing the second control unit for:
   executing the writing of the second data to the second storage area according to the new ownership function.

5. The method according to claim 4 further comprising:
   utilizing the first control unit for:
   receiving a second write request comprising instructions to write a third data; wherein the write request chronologically precedes the second write request and wherein the second data and the third data each pertain to a separate transaction;
   if the third data is destined to be written to the second storage area, sending instructions to the second control unit for writing of the third data to the second storage area only after an acknowledgement has been received indicating that the instructions to write the second data has been received at the second storage area.

6. The computerized method according to claim 1 further comprising:
   scanning the first storage device a second time and deleting any data that has been migrated according to the new ownership function.

7. The method according to claim 1 wherein write transactions received during the migration process are executed in an asynchronous manner to the migration process.

8. The method according to claim 7 further comprising:
   writing data in the write requests to the first storage area according to the old ownership function; and
   writing data in the write requests to the second storage area according to the new ownership function.

9. The computerized method according to claim 8 further comprising:
   determining whether a given data in a received write request pertains to data stored according to the old ownership function in an address which has already been scanned in the migration process;
   if it does, processing and writing the given data according to both the old ownership function and the new ownership function;
   if it does not, processing and writing the given data only according to old ownership function.

10. The computerized method according to claim 1 further comprising:
dividing data in the scanned storage area into data a plurality of data subgroups according to a predefined rule;
running the migration process on data in each subgroup at a different time, thereby reducing the load on the storage system.

11. The computerized method according to claim 1, wherein the storage area is a storage unit.

12. The computerized method according to claim 1, wherein the data addresses include any one of: logical block addresses; and metadata.

13. A storage system comprising a plurality of storage areas constituting a physical storage space operatively connected to an interface layer; the interface layer comprising at least one control unit; wherein data is assigned to a respective storage area in the storage system according to a predefined ownership function, the ownership function defines a connection between an address of the data and a respective storage area; the at least one control unit are configured, for executing a data migration process for migrating data from a first storage area to a second storage area in the data storage system, to:
receive a new ownership function;
scan data addresses of data in the first storage area;
identify in the first storage area a first data having a first data address, the first data is destined to be migrated to the second storage area, according to the new ownership function;
determine whether exists a second data, in a write request currently waiting to be written that comprises instructions to write the second data to a data address which is identical to the first data address, wherein the second data is in a commit data group, stored in designated computer memory; the commit data group comprising data from one or more write requests waiting to be written in an upcoming commit operation; and
if the second data exists, write the second data in the upcoming commit operation to the second storage area according to the new ownership function; and write the second data to the first storage area according to the first ownership function to replace the first data.

14. The storage system according to claim 13, wherein the at least one control unit being further configured, if the second data does not exist, to add the first data to the commit data group and write the first data in the upcoming commit operation.

15. The storage system according to claim 14 wherein the at least one control unit are further configured, upon completion of the scanning, to:
initiate an I/O intermission period;
replace the old ownership function with the new ownership function;
terminate the I/O intermission period; and
process incoming I/O requests according to the new ownership function.

16. The storage system according to claim 14 wherein the at least one control unit include at least a first control unit and a second control unit; the first control unit is assigned for controlling the first storage area and the second control unit is assigned for controlling the second storage area;
in the event the second data exists:
the first control unit is configured to:
execute the writing of the second data to the first storage area to replace the first data; and send instructions to the second control unit for writing of the second data to the second storage area; and
the second control unit is configured to:
execute the writing of the second data to the second storage area according to the new ownership function.

17. The storage system according to claim 16 wherein the first control unit is further configured to:
receive a second write request comprising instructions to write a third data; wherein the write request chronologically precedes the second write request and wherein the second data and the third data each pertain to a separate transaction;
if the third data is destined to be written to the second storage area, send instructions to the second control unit for writing of the third data to the second storage area only after an acknowledgement has been received indicating that the instructions to write the second data has been received at the second storage area.

18. The storage system according to claim 14 wherein the at least one control unit are configured to scan the first storage device a second time and delete data that has been migrated according to the new ownership function.

19. The storage system according to claim 14 wherein write transactions received during the migration process are executed in an asynchronous manner to the migration process.

20. The storage system according to claim 19 wherein the at least one control unit are further configured to process all the write transactions received during the migration process according to both the old ownership function and the new ownership function.

21. The storage system according to claim 19 wherein the at least one control unit are further configured to:
determine whether a given data in a received write request pertains to data stored according to the old ownership function in an address which already been scanned in the migration process;
if it does, process and writing the given data according to both the old ownership function and the new ownership function;
if it does not, process and writing the given data only according to old ownership function.

22. The storage system according to claim 14 wherein the at least one control unit are configured to:
divide data in the scanned storage area into data a plurality of data subgroups according to a predefined rule; and
run the migration process on data in each subgroup at a different time, thereby reducing the load on the storage system.

23. The storage device system according to claim 14 wherein each storage area comprises one or more storage devices; the one or more storage devices including any one of: a solid state drive and a hard drive disk.

24. A control unit operatively connected to an interface layer in a storage system, the storage system comprising a plurality of storage areas constituting a physical storage space operatively connected to an interface layer; wherein data is assigned to a respective storage area in the storage system according to a predefined ownership function, the ownership function defines a connection between an address of the data and a respective storage area; the control unit is configured, for executing a data migration process for migrating data from a first storage area to a second storage area in the data storage system, to:
receive a new ownership function;

scan data addresses of data in the first storage area;

identify in the first storage area a first data having a first data address, the first data is destined to be migrated to the second storage area, according to the new ownership function;

determine whether exists a second data, in a write request currently waiting to be written that comprises instructions to write the second data to a data address which is identical to the first data address, wherein the second data is in a commit data group, stored in designated computer memory; the commit data group comprising data from one or more write requests waiting to be written in an upcoming commit operation; and if the second data exists, write the second data in the upcoming commit operation to the second storage area according to the new ownership function; and write the second data to the first storage area according to the first ownership function to replace the first data.

25. A non-transitory program storage device readable by a computer, tangibly embodying a computer readable instructions executable by the computer to perform a computerized method of migrating data from a first storage area to a second storage area in a physical storage space of a data storage system; the physical storage space being operatively connected to an interface layer, the interface layer comprising at least one control unit; wherein data is assigned to a respective storage area in the physical storage space according to a predefined ownership function, the ownership function defines a connection between an address of the data and a respective storage area; the method comprising utilizing the at least one control unit for executing a data migration process, comprising:

receiving a new ownership function;

scanning data addresses of data in the first storage area;

identifying in the first storage area a first data having a first data address, the first data is destined to be migrated to the second storage area, according to the new ownership function;

determining whether exists a second data in a pending write request currently waiting to be written that comprises instructions to write the second data to a data address which is identical to the first data address, wherein the second data is in a commit data group, stored in designated computer memory; the commit data group comprising data from one or more write requests waiting to be written in an upcoming commit operation;

if the second data exists, writing the second data in the upcoming commit operation to the second storage area according to the new ownership function; and writing the second data to the first storage area according to the first ownership function to replace the first data; and if the second data does not exist, writing the first data to the second storage area according to the new ownership function.

26. The method according to claim 1 further comprising, responsive to determining that the second data does not exist, writing the first data to the second storage area according to the new ownership function.

27. The storage system according to claim 13 wherein the at least one control unit is further configured, responsive to determining that the second data does not exist, writing the first data to the second storage area according to the new ownership function.

28. The control unit according to claim 25 is further configured, responsive to determining that the second data does not exist, writing the first data to the second storage area according to the new ownership function.

* * * * *